US012062959B2

(12) United States Patent
Dominik et al.

(10) Patent No.: US 12,062,959 B2
(45) Date of Patent: Aug. 13, 2024

(54) COIL MODULE FOR AN ELECTRIC MACHINE

(71) Applicant: Vaionic Technologies GmbH, Berlin (DE)

(72) Inventors: Yannick Dominik, Berlin (DE); Jörg Berthelmann, Berlin (DE); Georg Franz, Berlin (DE)

(73) Assignee: Vaionic Technologies GmbH, Berlin (DE)

(*) Notice: Subject to any disclaimer, the term of this patent is extended or adjusted under 35 U.S.C. 154(b) by 0 days.

(21) Appl. No.: 17/750,808

(22) Filed: May 23, 2022

(65) Prior Publication Data

US 2022/0376576 A1 Nov. 24, 2022

Related U.S. Application Data

(60) Provisional application No. 63/191,442, filed on May 21, 2021, provisional application No. 63/191,450, filed on May 21, 2021.

(51) Int. Cl.
*H02K 3/18* (2006.01)
*H02K 3/04* (2006.01)
(Continued)

(52) U.S. Cl.
CPC ............. *H02K 3/18* (2013.01); *H02K 3/04* (2013.01); *H02K 3/38* (2013.01); *H02K 9/19* (2013.01)

(58) Field of Classification Search
CPC ............ H02K 1/14; H02K 21/24; H02K 3/04; H02K 3/18; H02K 3/24; H02K 3/38;
(Continued)

(56) References Cited

U.S. PATENT DOCUMENTS 6,040,650 A    3/2000  Rao
7,514,826 B2*  4/2009  Wakita .................. H02K 3/24
                                                  310/201
(Continued)

FOREIGN PATENT DOCUMENTS

DE   10 2017 204 072 A1   9/2018
EP        3460957 A1      3/2019
(Continued)

OTHER PUBLICATIONS

EP-3813237-A1, Dominik, all pages (Year: 2021).*
(Continued)

*Primary Examiner* — Naishadh N Desai
(74) *Attorney, Agent, or Firm* — Westman, Champlin & Koehler, P.A.

(57) ABSTRACT

The present invention relates to a coil module for an electric machine, comprising at least one coil disc comprising a coil carrier made of an electrically insulating material and a plurality of individual windings made of an electrically conductive material and being circumferentially arranged on the coil disc around a center of the coil disc. Each of the windings comprises two active regions extending radially from the center and two passive regions extending tangentially at its radially outer and inner edges, wherein, in a top view of the coil disc, the active regions of different windings do not overlap each other, but each passive region of one of the windings partially overlaps the corresponding passive regions of the two directly adjacent windings. In the active regions, the respective winding in cross-section has a greater thickness in the axial direction than in the passive regions.

12 Claims, 3 Drawing Sheets

(51) Int. Cl.
*H02K 3/38* (2006.01)
*H02K 9/19* (2006.01)

(58) Field of Classification Search
CPC ...... H02K 3/47; H02K 9/19; F02B 2075/025; C12Q 1/6848; C12Q 1/6869; C12Q 1/6874; C12Q 2527/125; C12Q 2527/127; C12Q 2535/113; C12Q 2535/122; C12Q 2537/143; C12Q 2563/107
See application file for complete search history.

(56) References Cited

U.S. PATENT DOCUMENTS

| | | | |
|---|---|---|---|
| 7,795,773 B1 | 9/2010 | Wittig | |
| 8,476,800 B2 * | 7/2013 | Lai | H02K 3/28 |
| | | | 310/179 |
| 8,558,425 B2 * | 10/2013 | Stahlhut | H02K 3/26 |
| | | | 310/268 |
| 11,201,516 B2 * | 12/2021 | Schuler | H02K 3/26 |
| 2008/0100166 A1 | 5/2008 | Stahlhut et al. | |
| 2011/0285224 A1 * | 11/2011 | Iki | H02K 3/47 |
| | | | 310/64 |
| 2020/0220406 A1 * | 7/2020 | Schuler | H02K 1/2798 |
| 2020/0227991 A1 | 7/2020 | Boettcher | |

FOREIGN PATENT DOCUMENTS

| | | | |
|---|---|---|---|
| EP | 3 813 238 A1 | 4/2021 | |
| EP | 3813237 A1 * | 4/2021 | ............. H02K 16/00 |
| WO | 2012128646 A1 | 9/2012 | |

OTHER PUBLICATIONS

European Search Report dated Aug. 4, 2020, for corresponding European Application No. 20 15 3605, 2 pages.
European Search Report dated Mar. 31, 2020, for corresponding European Application No. 19 20 5443, 2 pages.

* cited by examiner

COIL MODULE FOR AN ELECTRIC MACHINE

CROSS-REFERENCE TO RELATED APPLICATION(S)

This application claims priority to U.S. provisional application Nos. 63/191,442 and 63/191,450, which were both filed on May 21, 2021, the contents of which are hereby incorporated by reference in their entireties.

BACKGROUND

The present invention relates to a coil module for an electric machine.

Electric machines of various designs are known from the prior art. Document DE 10 2017 204 072 A1 describes a type of winding in a meander configuration for an electric motor in which a high density of electrically conductive material is ensured in the area of a magnetic field generated by permanent magnets. However, the flat wire used in this type of structure is disadvantageous due to its electromagnetic characteristics, which lead to inefficiency. In addition, a multiphase structure turns out to be difficult.

SUMMARY

Therefore, the present invention is based on the object of suggesting a coil module for an electric machine by means of which these disadvantages are overcome and a compact structure with reduced space requirements can be provided.

According to the invention, this object is achieved by a coil module according to claim 1. Advantageous embodiments and further modifications are described in the dependent claims.

A coil module for an electric machine comprises at least one coil disc. The coil disc in turn comprises a coil carrier made of an electrically insulating material and a plurality of individual windings made of an electrically conductive material, typically in wire form. The windings are circumferentially arranged on the at least one coil disc around a center of the at least one coil disc. Each of the windings comprises two active regions extending radially from the center and two passive regions extending tangentially at its radially outer and inner edges. In a top view of the at least one coil disc, the active regions of different windings do not overlap each other, but each passive region of one of the windings partially overlaps the corresponding passive regions of the two directly adjacent windings. In cross-section, a thickness of the respective winding in the axial direction is greater in the active regions than in the passive regions of the respective winding.

Due to the partial overlap in the passive regions, an amount of electrically conductive material, preferably copper, in the passive regions is typically twice that in the active regions. In order to prevent thickening of the coil disc and of a coil module formed from at least one coil disc in the axial direction, the thickness in cross-section in the active regions is greater than in the passive regions so that a compact structure is ensured. In this context, an electrically insulating material is intended to mean a material having an electrical conductivity of less than $10^{-8}$ S/m at a temperature of 25° C. In this context, an electrically conductive material is intended to mean any material whose electrical conductivity is greater than $10^6$ S/m at a temperature of 25° C. In accordance with common conventions, a radial direction is intended to mean a direction extending in a straight line from the center to the edge, and a tangential direction is correspondingly intended to mean a direction extending at a right angle to the radial direction. Due to the fact that the cross-section of the circumferentially arranged windings changes between active regions and passive regions, an axial distance of the air gap between magnetic discs can be varied and thus a relative copper filling ratio can be increased. In addition, a three-phase arrangement of the windings can be accommodated more easily due to the reduced thickness in the passive regions. In the context of the present application, a top view is intended to mean a view along a normal vector of the at least one coil disc, and a side view is correspondingly intended to mean a position angled by 90° with respect to the top view. The normal vector is to start from the area in which the length and the width of the at least one coil disc are greater than a thickness of the at least one coil disc. In the electric machine, the normal vector is thus parallel to the axis of rotation. The windings, also referred to as coils, are preferably provided as coreless windings or windings without iron core. In the context of the present application, the term "coil carrier" is intended to mean in particular a carrier for windings or coils which typically mechanically connects the windings and preferably is made of an epoxy resin or other temperature-resistant plastic. In the context of the present application, the term "coil disc" is intended to mean a corresponding ring comprising the coils or windings and being fixed by the coil carrier, while the term "coil module" is intended to denote a complete mounting part comprising at least one coil disc, but typically two or more coil discs.

A ratio of the thickness of the respective winding in the passive regions to the thickness in the active regions may be less than 1. Preferably, the ratio is greater than or equal to 0.3 and less than 1, and in the case of outer passive regions particularly preferably exactly 0.5, in order to take advantage of the greater available space and to create a uniform relative thickness with the active region of equal to 1 when the coil disc is looked at.

Typically, the shape of the cross-sectional area of the respective winding changes at a transition from an active region to a passive region. Preferably, a surface area of the cross-sectional area remains the same and a fill factor becomes maximum, which may occur, for example, during a pressing operation, but more material can be flown through by the magnetic field lines due to the changed shape and thus the drive can be rendered more efficient. Due to the changed shape, the space available for the electrically conductive material can be used in the electric machine while the magnet distance remains the same, and thus the performance and efficiency can be increased accordingly.

It can be provided that all active regions of different windings, typically of all windings, are arranged in a single plane in a side view. The arrangement in a single plane ensures that all active regions are equally located in the magnetic field of a magnet module.

Typically, the windings are formed from a fine strand of a plurality of wires electrically insulated from each other, wherein the wires electrically insulated from each other have a wire diameter of less than or equal to 0.1 mm. By means of a plurality of strands provided with an electrically insulating coating, sufficient flexibility of the winding formed from the wire can be ensured during production as well as a sufficiently high electrical conductivity can be achieved.

A number of the windings preferably corresponds to an integer multiple of three so that the windings enable a three-phase operation. Thus, a total of three strands of different phases are formed from the windings. In a particularly preferred manner, all active regions of the windings are located in a single plane in a side view, while the passive regions are distributed over two planes. Typically, two phases are in one plane and a third phase performs an additional plane change. The two planes are typically different from each other but parallel to each other.

It can be provided that all windings are identically designed, i.e., in particular have identical dimensions and shapes. Alternatively, it can also be provided that at least one winding that differs in shape or thickness from the remaining windings is used.

The coil disc can be configured such that an inner passive region and an outer passive region of one of the windings differ in thickness in the axial direction. In this context, the inner passive region is arranged at a smaller distance from the center of the coil disc and the coil module than the outer passive region. Typically, the thickness of the outer passive region of one of the windings is selected such that a ratio of the thickness of this region to the thickness of the active regions is less than or equal to 0.5. For the inner passive region, it can be provided that the ratio of the thickness of this inner passive region to the thickness of the active regions is less than 1. In this way, the cooling surface can be extended from the active regions to the outer passive regions.

An electric machine such as an electric motor or an electric generator comprises a bearing arrangement and a shaft guided in the bearing arrangement. At least one magnet module comprising a plurality of permanent magnets and at least one coil module exhibiting the above described properties are concentrically arranged along the shaft, wherein the magnet module is attached to the shaft and the coil module is connected to a housing. Due to the high packing density of the windings, a particularly advantageous efficiency and power density is achieved during the operation of the electric machine.

A film or foil made of an electrically insulating material may be adhered to the at least one coil module at least on its side facing the magnet module in order to prevent liquid from passing therethrough and in order to enable cooling channels to be formed. Instead of an adhesive connection, the film can also be applied by means of another connection such as a welded connection as a substance-to-substance bond or a non-positive or frictional connection, for example by means of a screwed-on ring.

In order to efficiently cool the electric machine and in particular the active regions, the at least one coil module may comprise at least two coil discs connected to each other and a cooling channel formed by a cavity between the two coil discs. Alternatively, or additionally, the cooling channel may be formed and bounded by the coil disc or the coil module and the film or foil.

BRIEF DESCRIPTION OF THE FIGURES

Exemplary embodiments of the invention are illustrated in the drawings and are explained in the following with reference to FIGS. 1 to 6, in which.

DETAILED DESCRIPTION OF THE EMBODIMENTS

Figure 1:
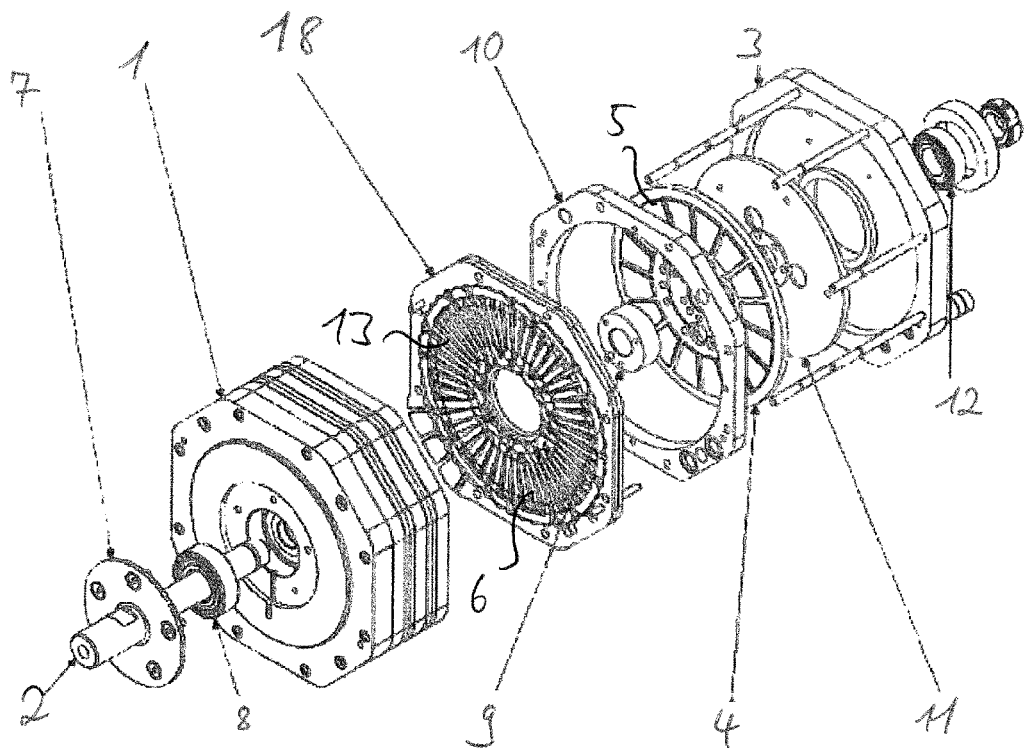
FIG. 1 shows an exploded view of an electric motor.

FIG. 1 shows an exploded view of an electric motor. A first bearing shield 1 forms a bearing arrangement together with a second bearing shield 3. A motor shaft 2 is centrally guided in the bearing shields 1 and 3 and is provided with a bearing cap 7 and a fixed bearing 8 in the region of the first bearing shield 1 and with a movable bearing 12 in the region of the second bearing shield 3. In the shown exemplary embodiment, the bearing shields 1 and 3, the bearing cap 7 and a coil spacer 10 and a magnet spacer 9 are made of polyamide, the motor shaft 2 is made of stainless steel, and the fixed bearing 8 and the movable bearing 12 are deep groove ball bearings made of steel.

A coil module 18 comprising two coil discs 6 axially arranged one behind the other and a magnetic disc 4 or magnetic module are visibly arranged between the first bearing shield 1 and the second bearing shield 3 and are kept at a predetermined spatial distance from each other by the coil spacer 10 and the magnet spacer 9. The coil module 18 is disc-shaped, i.e., its length and width are significantly greater than its thickness (which is measured in the axial direction in FIG. 1). In this context, the term "significantly greater" is intended to mean that its thickness is maximally 10 percent of its length or its width. Typically, the length and the width are equal. In the illustrated exemplary embodiment, the coil module 18 serves as a stator which, stacked on the motor shaft 2, is adjacent to two magnetic discs 4 or magnetic modules serving as rotors. The stator is centrally arranged between the two magnetic discs 4. In addition, in the exemplary embodiment shown in FIG. 1, a back iron 11 is provided between the magnetic disc 4 and the second bearing shield 3, but this back iron 11 may also be omitted or alternatively configured in further exemplary embodiments.

The magnetic discs 4 consist of a non-magnetizable, preferably electrically non-conductive material such as aluminum and are attached to the motor shaft 2 mounted in the bearings of the bearing shields 1 and 3. The magnet spacer 9, which provides an air gap between the magnetic discs 4, is also mounted on the motor shaft 2. Permanent magnets 5 are radially circumferentially arranged on the magnetic disc 4 in alternating orientation, i.e. always alternating with the north pole and the south pole pointing in the direction of the stator. A number of the permanent magnets 5 is always even. In the illustrated exemplary embodiment, the number of permanent magnets 5 just corresponds to twice a number of windings per phase.

In the exemplary embodiment shown in FIG. 1, an individual coil module 18 can be made from two coil discs 6, but it can also be provided to connect three or more of these coil discs 6 to each other and thus obtain the coil module 18. During operation, a cooling medium can be conducted in a cavity forming between the individual coil discs 6. The simplest but at the same time efficiently operable structure of the motor is one individual coil module 18 comprising a single coil disc 6 and two magnetic discs 4, but it can also be provided to provide correspondingly more coil modules 18 and magnetic discs 4, wherein a number of the magnetic discs 4 is typically greater by one than a number of the coil modules 18. Advantages of a corresponding modular design result from the variable number of installed coil modules 18 and magnetic discs 4, especially in the case of a corresponding shaft and bearing design. In addition to a combination of the two modules of coil module 18 and magnetic disc 4, the variation of the individual modules leads to further flexibility in the motor design. The coil module 18 and the magnetic disc 4 can be adapted independently of each other, e.g., only an adaptation of the permanent magnets 5 may be required, while the remaining structure remains unchanged.

Figure 2:
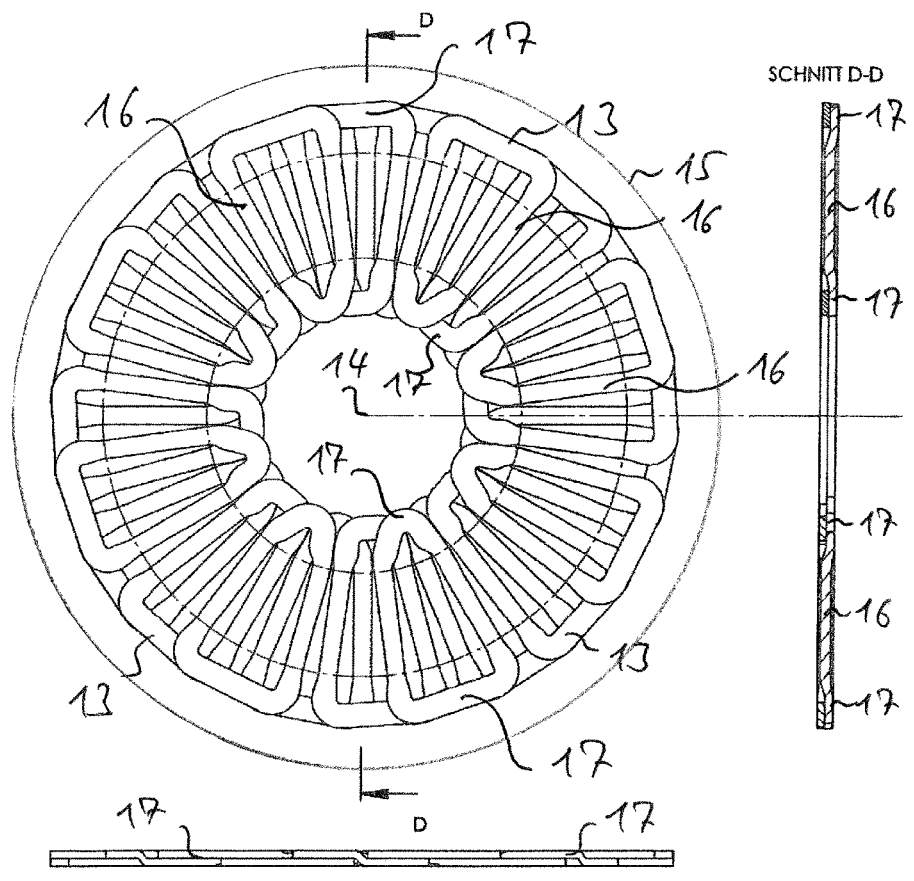
FIG. 2 shows a top view of a coil disc.

In FIG. 2, a coil carrier 15 forming the coil disc 6 and comprising windings 13 arranged thereon is shown in a top view, i.e., along a normal direction which is perpendicular both to the length and to the width of the coil module 18. Recurring features are indicated by identical reference signs in this Figure as well as in the following Figures. In a top view, the coil carrier 15 is round, i.e., in terms of size the length just corresponds to the width, and is made of an electrically insulating material. A plurality of individual windings 13 are radially circumferentially arranged on the coil carrier 15 around a center 14 of the coil carrier 15, wherein each of the windings 13 is electrically insulated from directly adjacent windings 13. At the center 14, the axis of rotation of the electric machine intersects the coil carrier 15. In the exemplary embodiment depicted in FIG. 2, these windings 13 are wound in three phases. Each winding consists of a plurality of turns of a wire strand. This entails that every third winding 13 in its arrangement in the compound has the same configuration. These windings 13 are also positioned identically in terms of their depth orientation and depth arrangement: a first phase is thus formed by the windings 13 visible as the uppermost layer in FIG. 1.

Each of the windings 13 comprises two radially extending active regions 16 starting from the center 14 of the coil disc 6 and contributing to the torque of the motor, and two tangentially extending passive regions 17 at its radially outer edge and inner edge. The inner passive regions 17, which are thus arranged closer to the center 14 than the outer passive regions 17, are shorter in length than the outer passive regions 17. The active regions 16 of different windings 13 do not overlap each other in a top view, i.e., in a view along the motor shaft 2, each of the passive regions 17 of one of the windings 13 partially overlaps the corresponding passive regions 17 of the two directly adjacent windings 13.

In the exemplary embodiment shown in FIG. 2, each of the three phases is made up of individual teeth, i.e., individual windings 13; wherein the individual windings 13 are wound so as to have a plurality of turns, but only a single turn can also be provided. A special feature is that the different phases in the active regions 16 structured in a spoke-like manner lie next to each other in a single plane. In FIG. 2, these active regions 16 are indicated by the two circular lines above the windings 13. Therefore, the active regions 16 are identical in shape and dimensions, while the passive regions 17 are differently structured both as regards their shape and as regards their dimensions.

The passive regions 17 comprise overlaps of every two adjacent teeth, which entails that the individual phases must perform a plane change. Without a change in cross-section, the thickness of the coil disc 6 in the area of the passive regions 17 doubles in the axial direction in the case of direct overlapping. An increase in an axial distance of the permanent magnets 5 resulting therefrom can be influenced by a change in cross-section, i.e., a change in the thickness-to-width ratio or height-to-width ratio, of the windings 13. A ratio of the thickness of the respective winding 13 in the active regions 16 to the thickness in the passive regions 17 is just 2 in the illustrated exemplary embodiment. In a simplified manner, a thickness or height of the active regions 16 (which are all identical in terms of their thickness in the shown exemplary embodiment) in the axial direction which has been standardized to 1 can be assumed in this context, whereas the passive regions 17 (which are also all identical in terms of their thickness in the shown exemplary embodiment) have a smaller thickness of 0.75 relative to this standardized thickness, but in a side view these thicknesses of the passive regions 17 add up to only 1.5 due to their arrangement in alignment one behind the other. Such an arrangement is shown, for example, in the sectional view in FIG. 2 on the right-hand side. While, considered individually, the passive regions 17 each have a smaller thickness or height than the active regions 16, the passive regions 17 appear to be thicker in the superimposed arrangement of the windings 13 due to the overlaps and additional available space is obtained in the central part in which the permanent magnets 5 can be guided closer to the active regions 16. The lower part of FIG. 2 schematically illustrates a course of the outer side of the passive regions 17. This schematic illustration makes it clear that every third winding 13 performs a plane change in its passive region 17. In the shown exemplary embodiment, a number of the windings 13 corresponds to an integer multiple of three, so that the windings 13 enable a three-phase operation. Thus, a total of three strands of different phases are formed from the windings 13, wherein all active regions 16 of the windings 13 are in a single plane in a side view, while the passive regions 17 are distributed over two planes. Two phases are in one plane and a third phase performs an additional plane change.

Two phases can be stacked or placed next to each other, for example, in the radial direction instead of in the axial direction by means of a corresponding change in cross-section, resulting in an enlargement of the coil disc 6 in the radial direction. When the height or thickness of the passive regions 17 is doubled in the radial direction, doubling of the two phases in the axial direction is compensated for and one plane is achieved for the entire coil disc 6. Hence, this leads to a three-phase wound air-core coil module 18 with an adaptable cross-sectional change of the windings 13 and thus to an adaptable axial height of the coil module 18 for use in axial flux electric motors without iron core.

Thus, in the exemplary embodiment shown in FIG. 2, eight windings 13 arranged in a circle and electrically connected in series form a coil. Corresponding to the three phases of the electric current, three of these coils are combined with the coil carrier 15 in the coil disc 6 and the coil module 18.

In further exemplary embodiments, it is also possible to adhere two or more coil discs 6 to each other or otherwise bond or connect them to each other in a substance-to-substance or non-positive or friction-locking manner in order to thus obtain the coil module 18. A size of the cavity between the active regions 16 can be adjusted by a change in the cross-section of the coil structure formed by the windings 13.

Figure 3:
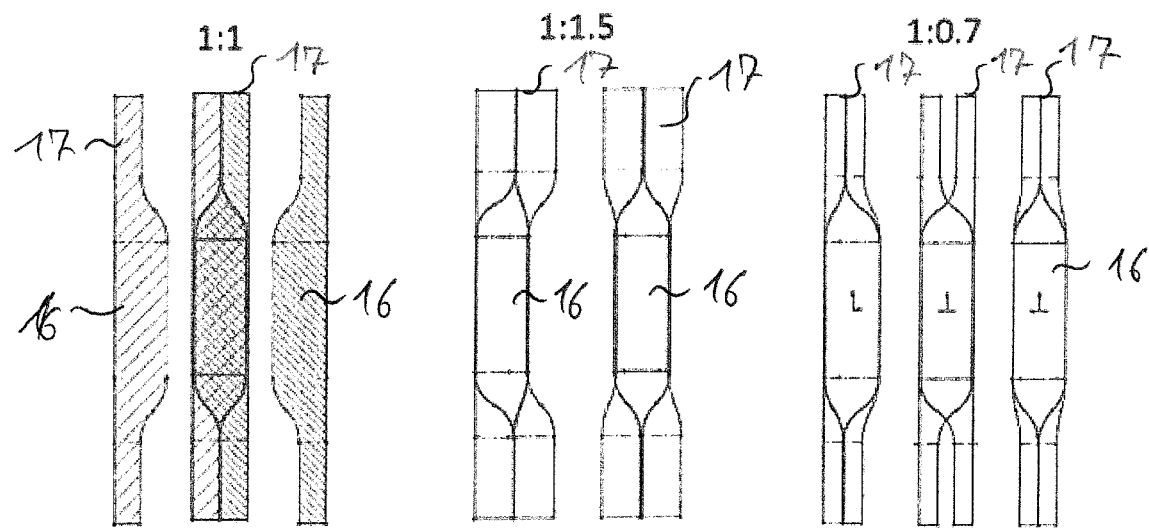
FIG. 3 shows a side view of a coil module.

FIG. 3 shows a schematic side view of corresponding cross-sectional changes on the coil disc 6. On the left-hand side, below the indication of the ratio of 1:1, FIG. 3 schematically illustrates a winding 13, in said winding 13 the passive regions 17 being only half as thick as the active regions 16. In a single coil disc 6, only the passive regions 17 always overlap partially (and never completely), but never the active regions 16. The thicker active regions 16 are arranged one behind the other in the same plane in the left view of FIG. 3, while the passive regions 17, due to the change in cross-section, are only half as thick and, due to the different planes, exhibit an overall ratio between active regions 16 and passive regions 17 of 1:1, i.e., the sum of the thicknesses of the passive regions 17 is just equal to the thickness of the active regions 16 in cross-section.

In the middle drawing in FIG. 3 with the ratio 1:1.5, the coil disc 6 is again shown in cross-section. Due to the overlap, the passive regions 17 are now just 1.5 times thicker in total in the depicted cross-sectional view than the active regions 16, which require less available space due to their arrangement one behind the other in a side view. The two exemplary embodiments shown below the indication of 1:1.5 show different plane changes, resulting in one cavity on the right-hand side of the active region 16 in the first exemplary embodiment (left) and two cavities on either side of the active region 16 in the second exemplary embodiment (right). The magnets of the magnet arrangement can be inserted into cavities formed in this way and thus the axial distance or gap between the active regions 16 and the permanent magnets 5 can be reduced (even though this gap cannot disappear completely). The available space is thus utilized more efficiently. Alternatively, the cavities that form can also be used for cooling.

Finally, a ratio of 1:0.7 is shown on the right-hand side of FIG. 3. The three depicted exemplary embodiments illustrate a formation of cavities by means of appropriate cross-sectional and plane changes in the passive regions 17. These cavities can also be used for cooling. In the described exemplary embodiments, flexible wire strands made of copper or aluminum and having a diameter of less than 2 mm, namely 1.2 mm in the shown exemplary embodiment, are preferably used for the windings 13, wherein said wire strands consist of a plurality of individual wires electrically insulated from each other and having a diameter of less than 0.2 mm, but typically 0.05 mm in the shown exemplary embodiment.

A cavity formed between the active regions 16, configured as bars, of the coil discs 6 forming the coil module 18 can be used for a cooling medium to flow through. In this case, for the purpose of hydraulic sealing, a fluid-tight film or foil made of an electrically non-conductive material is adhered to the coil discs 6 on a side facing the magnetic disc 4 so that the coil module 18 formed from a plurality of coil discs 6 is sealed towards the outside. The cavities may be rectangular, triangular or trapezoidal or have complex shapes.

Figure 4:
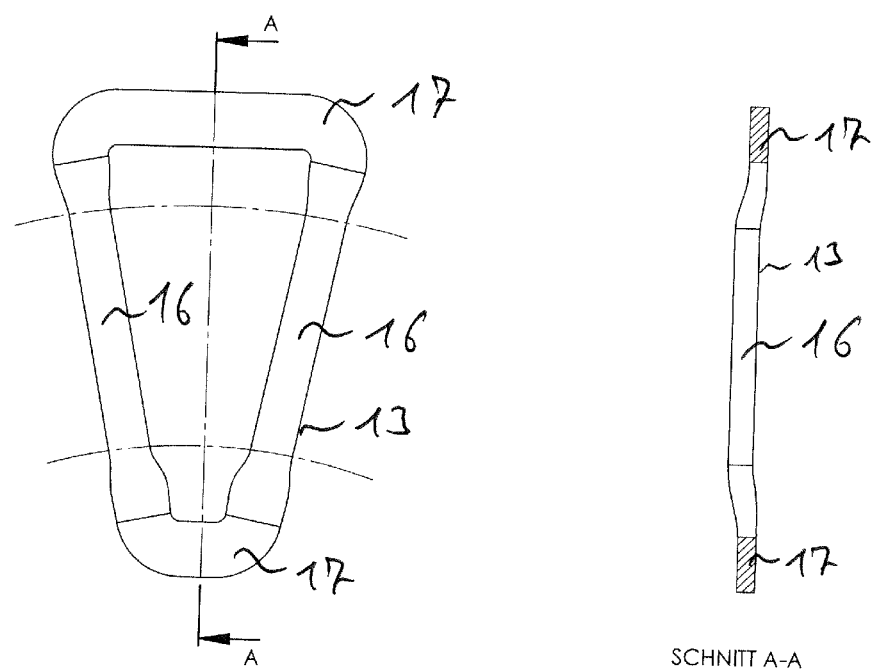
FIG. 4 shows a top view and sectional view of a winding.

In FIG. 4, the left-hand drawing shows a top view of one of the windings 13 as shown in FIG. 2. The sectional view through the winding 13 as shown on the right-hand side of FIG. 4 reveals that in the active regions 16 the thickness is greater than in the passive regions 17.

Figure 5:
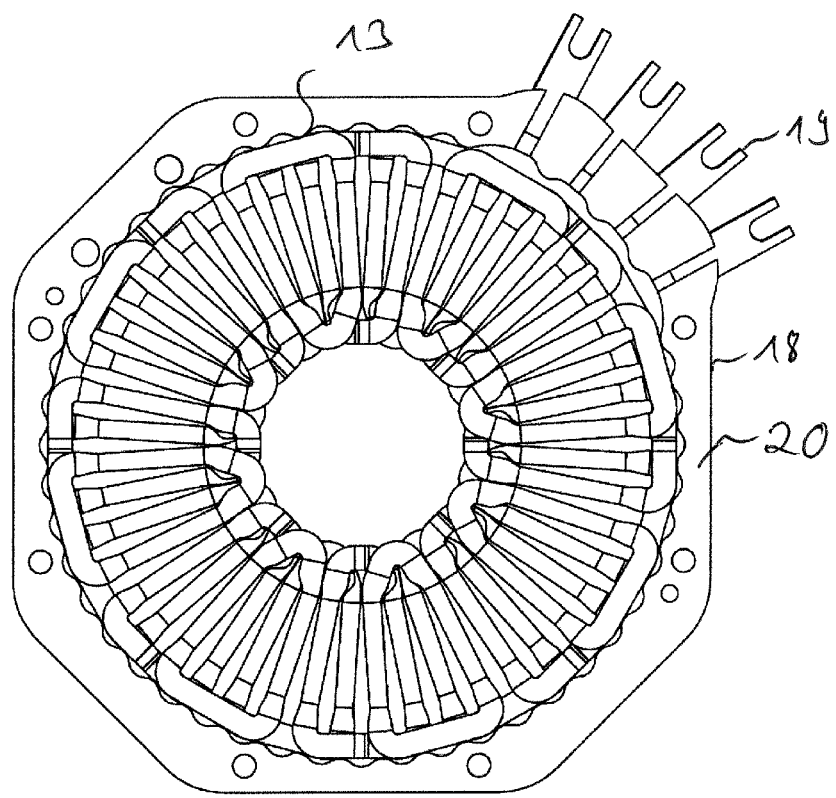
FIG. 5 shows a top view of the coil module.

In a top view corresponding to FIG. 2, FIG. 5 shows a coil module 18 in which two coil discs 6 are arranged one behind the other in the axial direction and embedded in a coil carrier ring 20 supplementing the coil carrier 15, wherein from the windings 13 electrical contacts 19 are led out of the coil carrier ring 20. In this exemplary embodiment, the coil carrier ring 20 is made of a fiberglass epoxy resin fabric.

Figure 6:
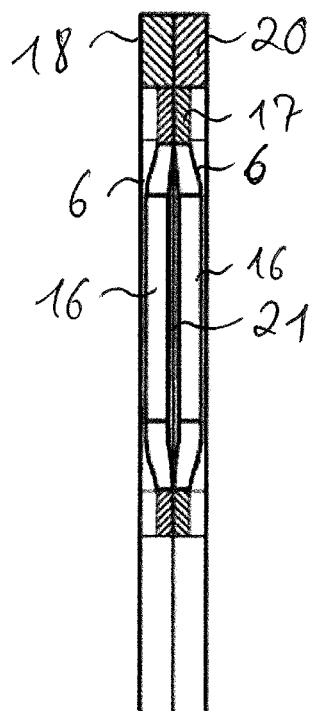
FIG. 6 shows a sectional view of the coil module.

FIG. 6 shows the coil module 18 in a sectional view, wherein the two coil discs 6 combined with each other are arranged such that a cavity 21 is formed between the active regions 16 of both coil discs 6. Since the coil discs are sealed in a fluid-tight manner by means of a film or foil, a cooling medium can be introduced into this cavity 21.

Features of the various embodiments disclosed only in the exemplary embodiments can be combined with each other and individually claimed.

The invention claimed is:

1. A coil module for an electric machine, comprising:
   at least one coil disc comprising:
      at least one a coil carrier made of an electrically insulating material and
      a plurality of individual windings made of an electrically conductive material and being circumferentially arranged on the at least one coil disc around a center of the at least one coil disc, wherein
      each of the windings comprises two active regions extending radially from the center and two passive regions extending tangentially at its radially outer and inner edges, and
      in a top view of the coil disc, the active regions of different windings do not overlap each other, but each passive region of one of the windings partially overlaps the corresponding passive regions of the two directly adjacent windings, characterized in that,
      in the active regions, the respective winding in cross-section has a greater thickness in the axial direction than in the passive regions.

2. The coil module according to claim 1, characterized in that a ratio of the thickness of the respective winding in the passive regions to the thickness in the active regions is less than 1.

3. The coil module according to claim 1, characterized in that the ratio of the thickness of the respective winding in the passive regions to the thickness in the active regions is greater than or equal to 0.3 and less than 1.

4. The coil module according to claim 1, characterized in that the shape of the cross-sectional area of the respective winding changes at a transition from an active region to a passive region.

5. The coil module according to claim 1, characterized in that all active regions of different windings are arranged in a single plane in a side view.

6. The coil module according to claim 1, characterized in that the windings are formed from a fine strand of a plurality of wires electrically insulated from each other, wherein the wires electrically insulated from each other have a wire diameter of less than or equal to 0.1 mm.

7. The coil module according to claim 1, characterized in that a number of the windings corresponds to an integer multiple of three so that the windings enable a three-phase operation.

8. The coil module according to claim 1, characterized in that an inner passive region and an outer passive region of one of the windings differ in thickness in the axial direction.

9. The coil module according to claim 8, characterized in that the thickness of the outer passive region of one of the windings is selected such that a ratio of the thickness of this region to the thickness of the active regions is less than or equal to 0.5.

10. An electric machine comprising a bearing arrangement and a shaft guided in the bearing arrangement, wherein at least one magnet module comprising a plurality of permanent magnets and at least one coil module according to claim 1 are concentrically arranged along the shaft.

11. The electric machine according to claim 10, characterized in that a film or foil made of an electrically insulating material is adhered to the at least one coil module at least on its side facing the magnet module.

12. The electric machine according to claim 10, characterized in that the at least one coil module comprises at least two coil discs connected to each other and a cooling channel formed by a cavity between the two coil discs.

* * * * *